(12) United States Patent
Lee

(10) Patent No.: US 6,529,296 B1
(45) Date of Patent: Mar. 4, 2003

(54) HOLOGRAM SCANNER

(75) Inventor: Moon-gyu Lee, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/635,491

(22) Filed: Aug. 9, 2000

(30) Foreign Application Priority Data

Aug. 12, 1999 (KR) ............................................. 99-33109

(51) Int. Cl.⁷ ................................................. G02B 5/32
(52) U.S. Cl. ........................... 359/18; 359/17; 359/209; 235/462.33; 235/462.34
(58) Field of Search ........................... 359/17, 18, 209; 235/462.34, 462.33, 462.39

(56) References Cited

U.S. PATENT DOCUMENTS 4,623,791 A * 11/1986 Kaneko ........................ 359/18
5,550,655 A *  8/1996 Kayashima .................. 359/18

FOREIGN PATENT DOCUMENTS

JP         08-1463378        6/1996

OTHER PUBLICATIONS

Korean KIPO Office action issued on the 26th of Jul. 2002 entitled Notice to Submit Response (English Language Translation of Notice to Submit Response dated Jul. 26, 2002 for corresponding Korean Patent Application 10–1999–0033109.

* cited by examiner

Primary Examiner—Cassandra Spyrou
Assistant Examiner—Leo Boutsikaris
(74) Attorney, Agent, or Firm—Robert E. Bushnell, Esq.

(57) ABSTRACT

A hologram scanner is constructed with a driving source for providing a rotational force, a deflection disk installed at the rotation shaft of the driving source for forming a scanning line, the deflection disk having a plurality of sectors where a hologram pattern for diffracting and deflecting incident light is formed, a TE polarized light emitting device, arranged to face one side of the deflection disk, for emitting TE polarized light so that major axis of an elliptical spot formed at a predetermined position on the deflection disk by the incident light is perpendicular to the radius vector of the deflection disk passing through the spot having an elliptical cross-section and a TE polarization mode, and an optical path altering device for altering the proceeding path of incident light, so that a scanning line formed by the rotation of the deflection disk proceeds to a photoreceptor medium.

10 Claims, 8 Drawing Sheets

HOLOGRAM SCANNER

CLAIM OF PRIORITY

This application makes reference to, incorporates the same herein, and claims all benefits accruing under 35 U.S.C. §119 from the inventor's application HOLOGRAM SCANNER filed with the Korean Industrial Property Office on the 12$^{th}$ day of August 1999, and there duly assigned Ser. No. 33109/1999.

BACKGROUND OF THE INVENTION

1. Field of the Invention

The present invention relates generally to hologram scanners and scanning processes. More particularly, it relates to hologram scanners for and to processes for forming a scanning line by diffracting and deflecting incident light.

2. Description of the Related Art

A typical hologram scanner uses a light source to emit a laser beam, a deflector that diffracts and deflects the incident laser beam, and an optical device to alter the proceeding direction of a scanning line, so that the laser beam diffracted and deflected by the deflector will be scanned in an in-scan direction across a photoreceptor medium, and successive scan lines will proceed in a predetermined direction. The deflector typically has a driving source that provides a rotation force, and a deflection disk with a plurality of sectors each having a hologram pattern.

The optical arrangement of the light source relative to the deflection disk is determined in terms of two restriction conditions. First, in recognition of the modulation feature of the laser diode, the minor axis of a light spot must be aligned in the in-scan direction of the photoreceptor medium. Second, the cross-sectional shape of the beam can be reversed according to a predetermined relation between the light spot and numerical aperture of a lens component. The ellipticity of the light spot inversely proportional to the numerical aperture because the wavelength of the light emitted from the laser diode is constant.

The efficiency of diffraction is influenced by the polarization of the incident light. Thus, in a conventional hologram scanner, when a comparison is made of the efficiency of diffraction, the light of transverse electric (TE) polarization can obtain the same efficiency of diffraction with a pattern that has a relatively lesser depth than the light of transverse electric (TE) polarization. In order to obtain a desired efficiency of diffraction with the light of TE polarization in a conventional scanner structure, a pattern of a relatively greater depth is needed with respect to the input of the light of TE polarization to the deflection disk. When a hologram pattern is formed that has a relatively greater depth relative to a fixed track pitch however, the shape of the pattern may be deformed and the efficiency of diffraction may be lowered. Consequently, it is difficult to manufacture the holographic pattern.

SUMMARY OF THE INVENTION

It is therefore, an object of the present invention to provide an improved hologram scanning process and hologram scanner.

It is another object to provide a hologram scanning process and hologram scanner for forming a scanning line by diffracting and deflecting incident light.

It is still another object to provide a hologram scanning process and hologram scanner able to easily form a hologram pattern with respect to a deflection disk by specifying the polarization direction of a laser beam input to the deflection disk.

It is yet another object to provide a hologram scanning process and hologram scanner in which light of TE polarization is incident upon a deflection disk so that a desired efficiency of diffraction can be obtained with a pattern having a relatively shallow depth.

Accordingly, these and other objects may be attained with a hologram scanning process and hologram scanner driving source to provide a rotational force, a deflection disk installed at the rotation shaft of the driving source for forming a scanning line, the deflection disk having a plurality of sectors where a hologram pattern for diffracting and deflecting incident light is formed, a TE polarized light emitting device, arranged to face one side of the deflection disk, for emitting TE polarized light so that major axis of an elliptical spot formed at a predetermined position on the deflection disk by the incident light is perpendicular to the radius vector of the deflection disk passing through the spot having an elliptical cross-section and a TE polarization mode, and an optical path altering device for altering the proceeding path of incident light so that a scanning line formed by the rotation of the deflection disk proceeds to a photoreceptor medium.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components.

DETAILED DESCRIPTION OF THE INVENTION

Figure 1:
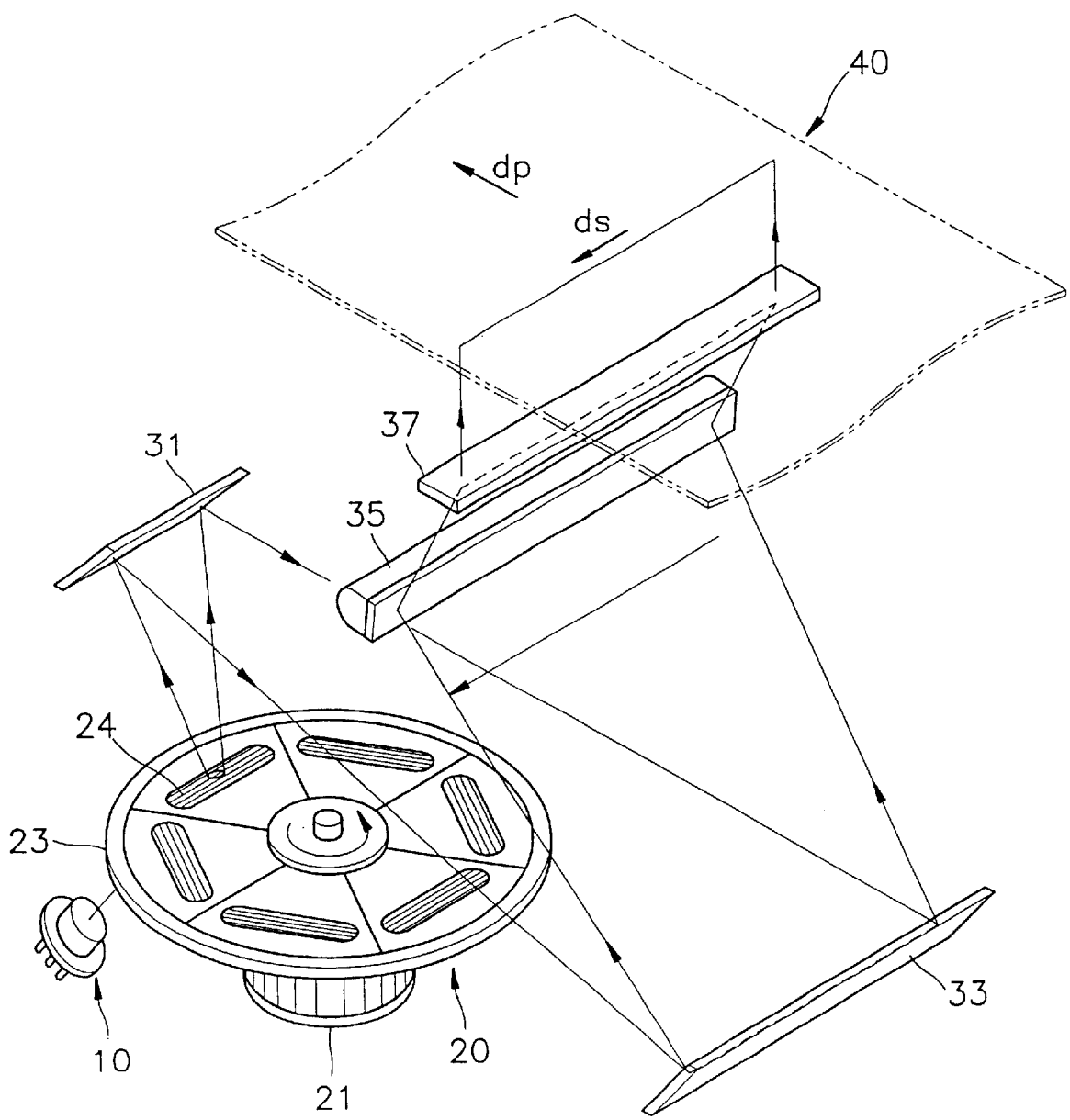
FIG. 1 is a perspective view showing the optical arrangement of a hologram scanner using a conventional deflection disk.

Turning now to FIG. 1, a hologram scanner is typically constructed with a light source 10 for emitting a laser beam, a deflector 20 for diffracting and deflecting the incident laser beam, and an optical path altering device for altering the proceeding direction of a scanning line so that the laser beam diffracted and deflected by deflector 20 is scanned in an in-scan direction ds across a photoreceptor medium 40, and successive scan lines proceed in a predetermined direction dp.

Figure 2:
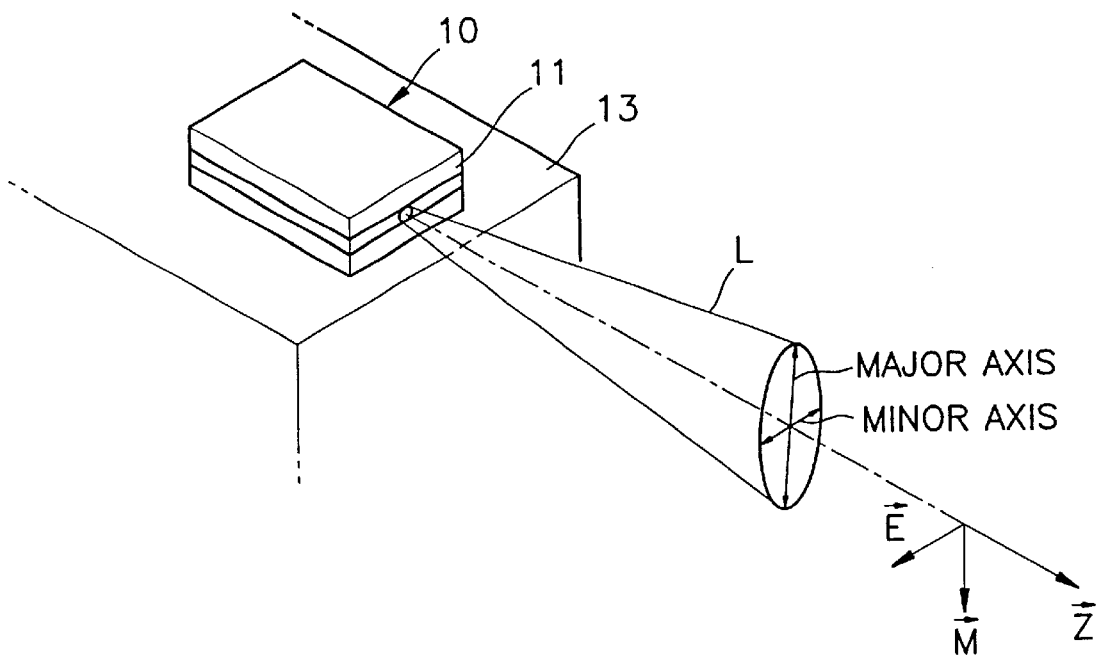
FIG. 2 is a view showing the light source of FIG. 1 and the shape of a beam emitted therefrom.

Light source 10 as shown in FIG. 2, is installed on a substrate 13 and includes an edge emitting laser diode 11 for laterally, emitting a laser beam. Laser diode 11 has a structure in which semiconductor material layers are deposited on substrate 13 and a laser beam L is emitted from the lateral side of the stacked semiconductor layers (in a direction z). Laser diode 11 emits light of a TE (transverse electric) polarization mode, that is, light of S-polarization. This means that electric field component $\vec{E}$ of the emitted light is parallel to the plane of the semiconductor material layers. Also, in laser diode 11 there is difference in the vertical direction and the horizontal direction at the start point of the emitted light, that is, astigmatism. Accordingly, the sectional view of the laser beam is elliptical and the major axis thereof is aligned perpendicular to the plane of the semiconductor layers. Thus, in light emitted from laser diode 11, magnetic field component $\vec{M}$ is parallel to the major axis and electric field component $\vec{E}$ is parallel to the minor axis.

Figure 3:
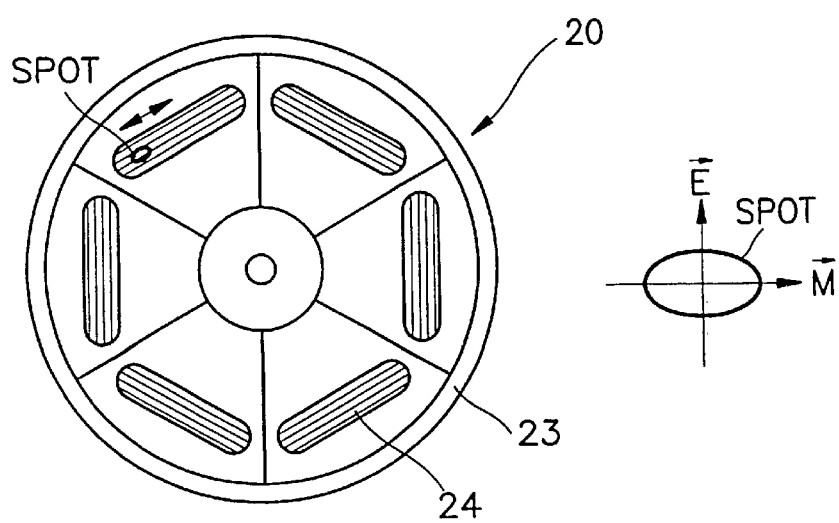
FIG. 3 is a plan view showing the deflection disk of FIG. 1.

Referring to FIGS. 1 and 3 together, deflector 20 includes a driving source 21 for providing a rotation force, and a deflection disk 23 having a plurality of sectors at each of which a hologram pattern 24 is formed. Here, the optical arrangement of light source 10 with respect to deflection disk 23 is determined in consideration of the following two restriction conditions.

Figure 4:
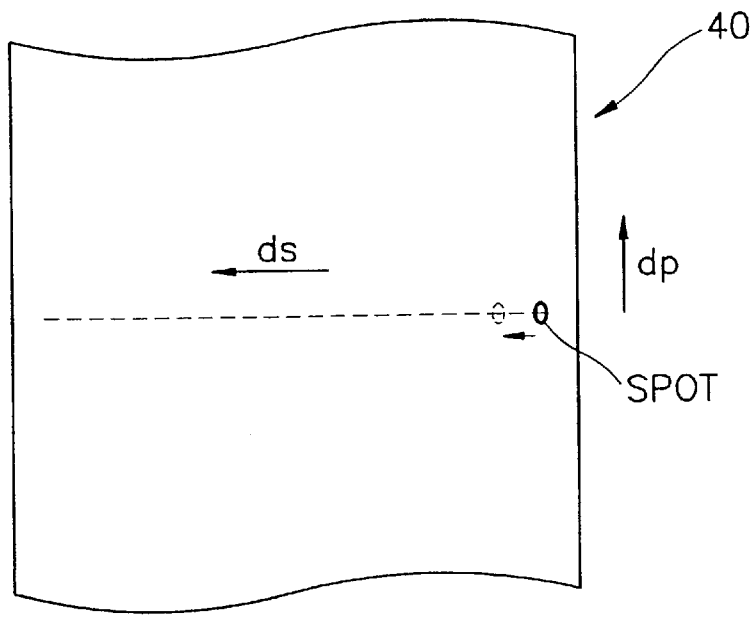
FIG. 4 is a view showing a part of a photoreceptor medium and the light scanned by the hologram scanner on the photoreceptor medium.

The first restriction condition is that considering the modulation feature of the laser diode, the minor axis of a light spot (SPOT) must be aligned in the in-scan direction ds of photoreceptor medium 40, as shown in FIG. 4. For the second restriction condition, it must be taken into consideration that, as shown in the following mathematical expression 1, the cross-sectional shape of the beam can be reversed according to a relation between the light spot (SPOT) and numerical aperture (NA) of a lens component.

$$\text{Shape of spot} \sim \frac{\lambda}{NA} \quad (1)$$

where λ denotes the wavelength of incident light. Since the wavelength of the light emitted from the laser diode is constant, the ellipticity of the light spot (SPOT) is. inversely proportional to the numerical aperture.

The optical path altering device includes flat mirrors 31 and 33 for changing the proceeding path of the beam, a curved mirror 35 for correcting bow and aberration, and a hologram device 37 for diffracting and transmitting the scanning beam reflected by curved mirror 35 toward photoreceptor medium 40. Here, curved mirror 35 and hologram device 37 are members corresponding to the lens element.

Figure 5:
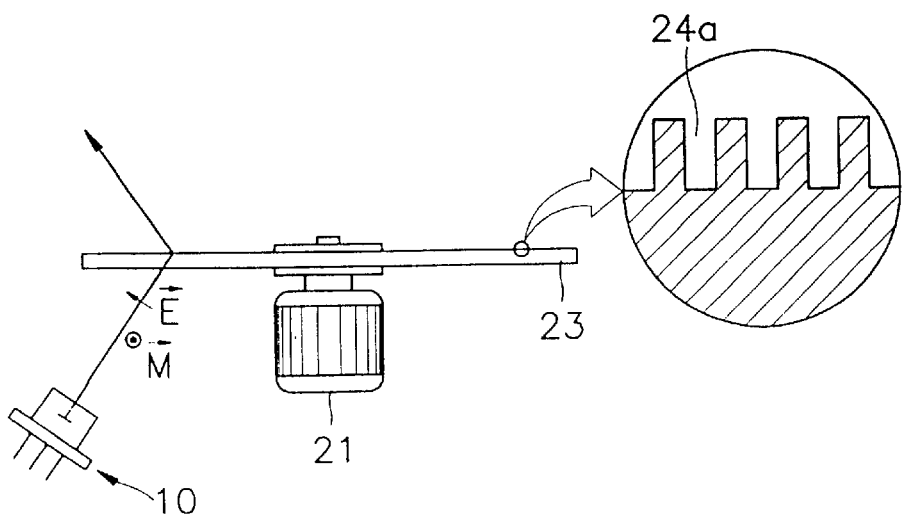
FIG. 5 is a lateral view showing the major components of the hologram scanner of FIG. 1 and the polarization of the light emitted from the conventional light source and landing on the deflection disk.

Thus, considering the above conditions and the alignment of the optical path altering device, the major axis of a spot (SPOT) formed on deflection disk 23 by the incident light must be aligned perpendicular to the radius vector of deflection disk 23 passing through the spot, as shown in FIG. 3. Light source 10 must be arranged with respect to the deflection disk 23, as shown in FIG. 5. When the light emitted from laser diode 11 toward deflection disk 23 is viewed from deflection disk 23, as the magnetic field component $\vec{M}$ is parallel to the boundary surface of deflection disk 23, the incident light has TM (transverse magnetic) polarization. Here, when a hologram pattern is formed on deflection disk 23, the depth of the pattern is determined to be different according to the polarization property of the incident light.

Figure 6:
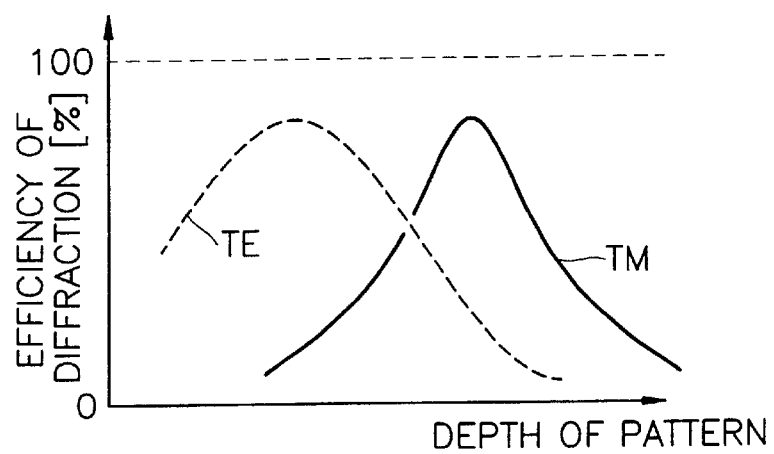
FIG. 6 is a graph showing the relationship between the depth of the pattern of the deflection disk, the polarization of the incident light, and the efficiency of diffraction.

FIG. 6 is a graph for explaining the relationship between the depth of the pattern of the deflection disk and the efficiency of diffraction for the two cases of the incident light having either TE or TM polarization. From the above graph, it can be seen that the efficiency of diffraction is influenced by the polarization of the incident light as seen from deflation disk 23. That is, when the efficiency of diffraction is in comparison, the light of TE polarization can obtain the same efficiency of diffraction with a pattern having a relatively lesser depth than the light of TM polarization.

Thus, in a conventional hologram scanner having the above structure according to the light of TM polarization is input, to obtain a desired efficiency of diffraction, a pattern of a relatively greater depth is needed with respect to the input of the light of TE polarization to the deflection disk.

Here, when a hologram pattern having a relatively greater depth with respect to a fixed track pitch is formed, the shape of the pattern may be deformed and the efficiency of diffraction may be lowered. Hence, manufacturing the hologram pattern becomes difficult.

Figure 7:
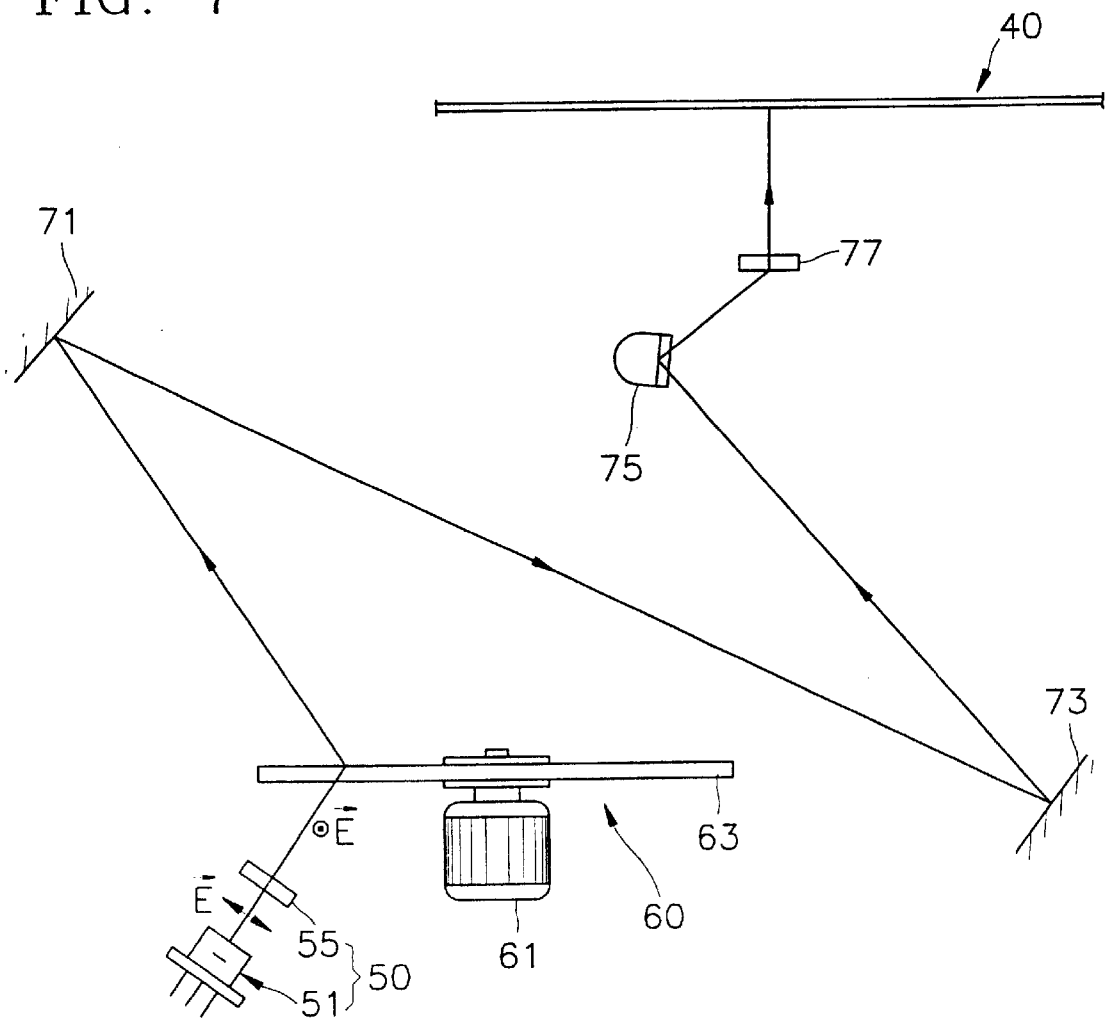
FIG. 7 is a view showing the optical arrangement of a hologram scanner according to a preferred embodiment of the present invention.
Figure 8:
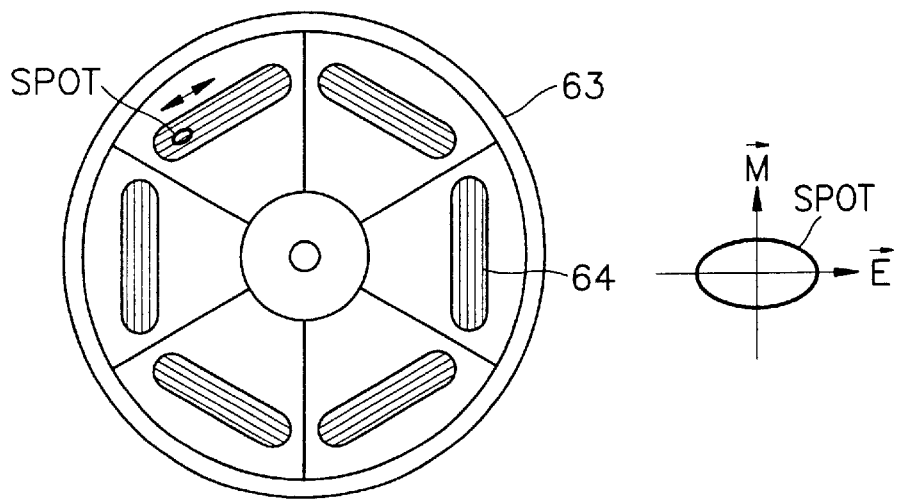
FIG. 8 is a plan view showing the deflection disk of FIG. 7.

Referring now to FIGS. 7 and 8, a hologram scanner constructed according to the principles of the present invention includes a TE polarized light emitting device 50, a deflector 60 for diffracting and deflecting incident light, and an optical path altering device for altering the proceeding direction of a scanning line so that the light diffracted and deflected by deflector 60 can be scanned in the in-scan direction across a medium where the scanning line is formed, for example, a photoreceptor medium 40. Deflector 60 includes a driving source 61, and a deflection disk 63 installed on the rotation shaft of driving source 61 for forming a scanning line. Deflection disk 63 has a plurality of sectors, on each of which a hologram pattern 64 for diffracting and deflecting the incident light is formed.

TE polarized light emitting device 50 is disposed to face one side of deflection disk 63 and emits TE polarized light such that an elliptical light spot (SPOT) is projected onto deflection disk 63 with the major axis of the spot aligned perpendicular to the radius vector of the deflection disk 63 at the point of projection.

TE polarized light emitting device 50, according to a preferred embodiment, is formed by depositing semiconductor material layers on a substrate, and includes a laser diode 51 for emitting from the side of the stacked semiconductor layers TE polarized light having an elliptical cross-section of which the major axis is aligned perpendicular to the plane of the semiconductor material layers, and a half wavelength plate 55 positioned in the optical path between laser diode 51 and deflection disk 63 for changing the direction of polarization.

Figure 9:
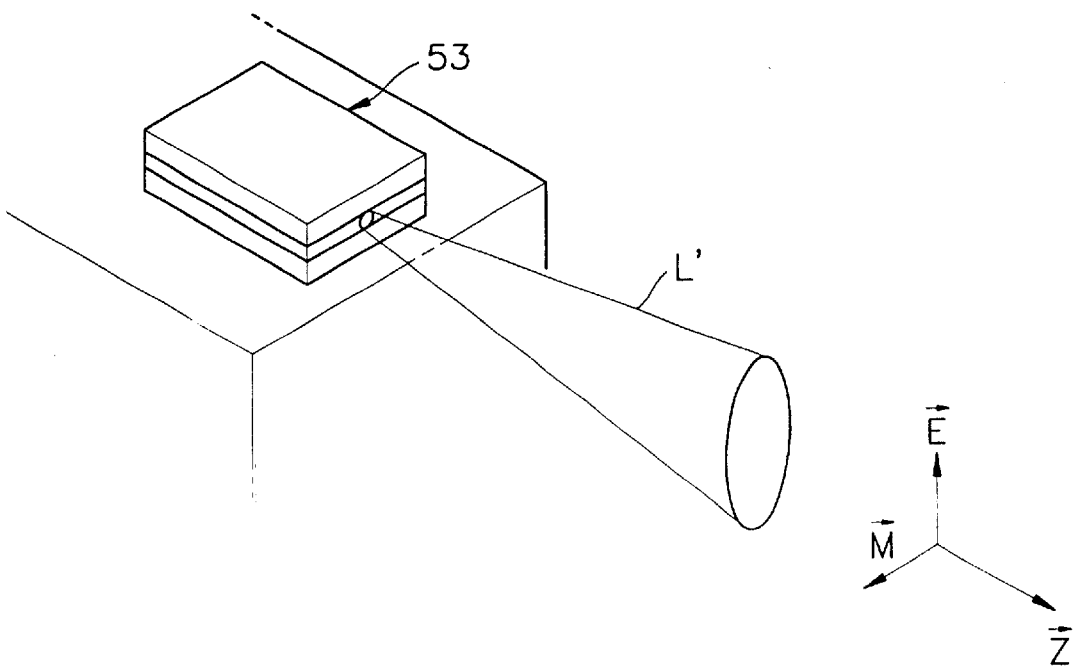
FIG. 9 is a perspective view showing the light source according to the preferred embodiment of the present invention.

Laser diode 51 emits light of TE polarization in which direction of the electric field $\vec{E}$ is aligned parallel to the boundary of the semiconductor material layer. Also, laser diode 51 emits light having an elliptical cross-section of which the major axis is aligned in the direction of magnetic field $\vec{M}$. The half wavelength plate 55 delays the phase of incident light to change the polarization. That is, only the polarization is changed with no deformation of the shape of the incident light. Thus, in view of deflection disk 63, the light of a TE polarization mode in which the direction of the electric field $\vec{E}$ is parallel to the surface of deflection disk 63. The TE polarized light emitting device according to another preferred embodiment of the present invention, as shown in FIG. 9, is formed by depositing semiconductor material layers on a substrate, and includes a laser diode 53 for emitting light L' of P polarization having an elliptical cross-section of which the major axis is aligned perpendicular to the plane of the semiconductor material layers. Laser diode 53 is an edge emitting laser diode which emits TM polarized light of which magnetic field $\vec{M}$ direction is aligned to parallel to the plane of the semiconductor material layers. Thus, the major axis is aligned parallel to the direction of electric field $\vec{E}$.

Referring to FIG. 7, the optical path altering device includes flat mirrors 71 and 73 for reflecting the light deflected and diffracted by deflection disk 63 to change the proceeding path of the light, a curved mirror 75 for focusing and reflecting the light input via flat mirrors 71 and 73, and a hologram device 77 disposed between curved mirror 75 and the photoreceptor medium 40 for diffracting and transmitting the incident scanning line.

Here, the optical altering device reverses the shape of beam based on the relation between the light spot (SPOT) and the numerical aperture (NA) of a lens element as indicated in the above mathematical expression 1. Thus, the light having the major axis of a spot aligned perpendicular to the radius vector of the deflection. disk 63 at the point of projection passes the optical path altering device so that, when scanned on photoreceptor medium 40, the minor axis of the light spot is aligned in the in-scan direction of photoreceptor medium 40.

Figure 10A:
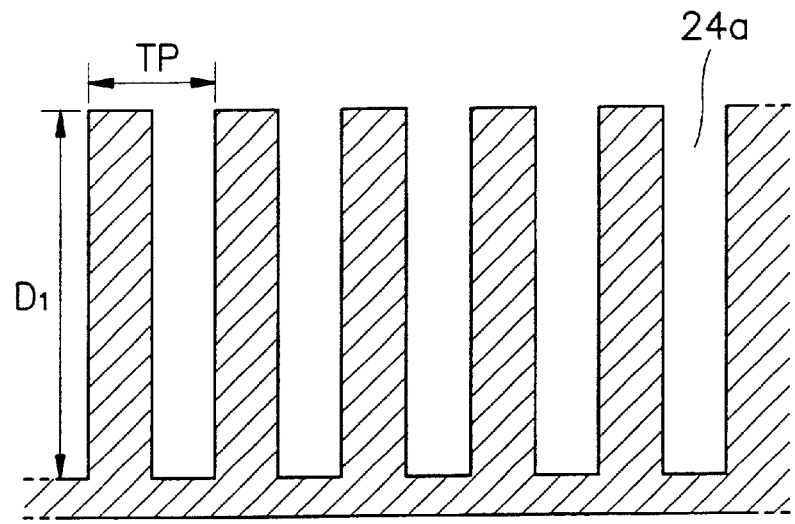
FIGS. 10A and 10B are sectional views showing the depths of hologram patterns according to the polarization property needed to obtain a predetermined efficiency of diffraction according to the conventional technology and the preferred embodiment of the present invention, respectively.
Figure 10B:
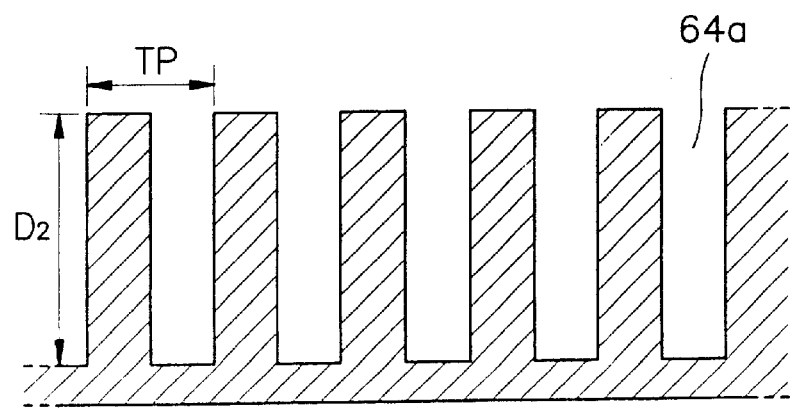

Considering the relation between the depth of the pattern and the efficiency of diffraction for light of TE polarization and light of TM polarization shown in FIG. 6, the hologram patten depths needed to obtain a predetermined diffraction efficiency it according to the conventional technology and the preferred embodiment of the present invention are shown in FIGS. 10A and 10B, respectively. That is, in hologram pattern 24a according to the conventional technology, desired efficiency of diffraction can be obtained with a pattern depth D1 with respect to track pitch TP. In hologram pattern 64a according to the preferred embodiment of the present invention, the same desired efficiency of diffraction can be obtained with a pattern depth D2 which is relatively less than pattern depth D1 with respect to the same track pitch TP.

The depth of a pattern needed to obtain a desired efficiency of diffraction depending on polarization as described above is shown with reference to detailed experimental data.

Figure 11:
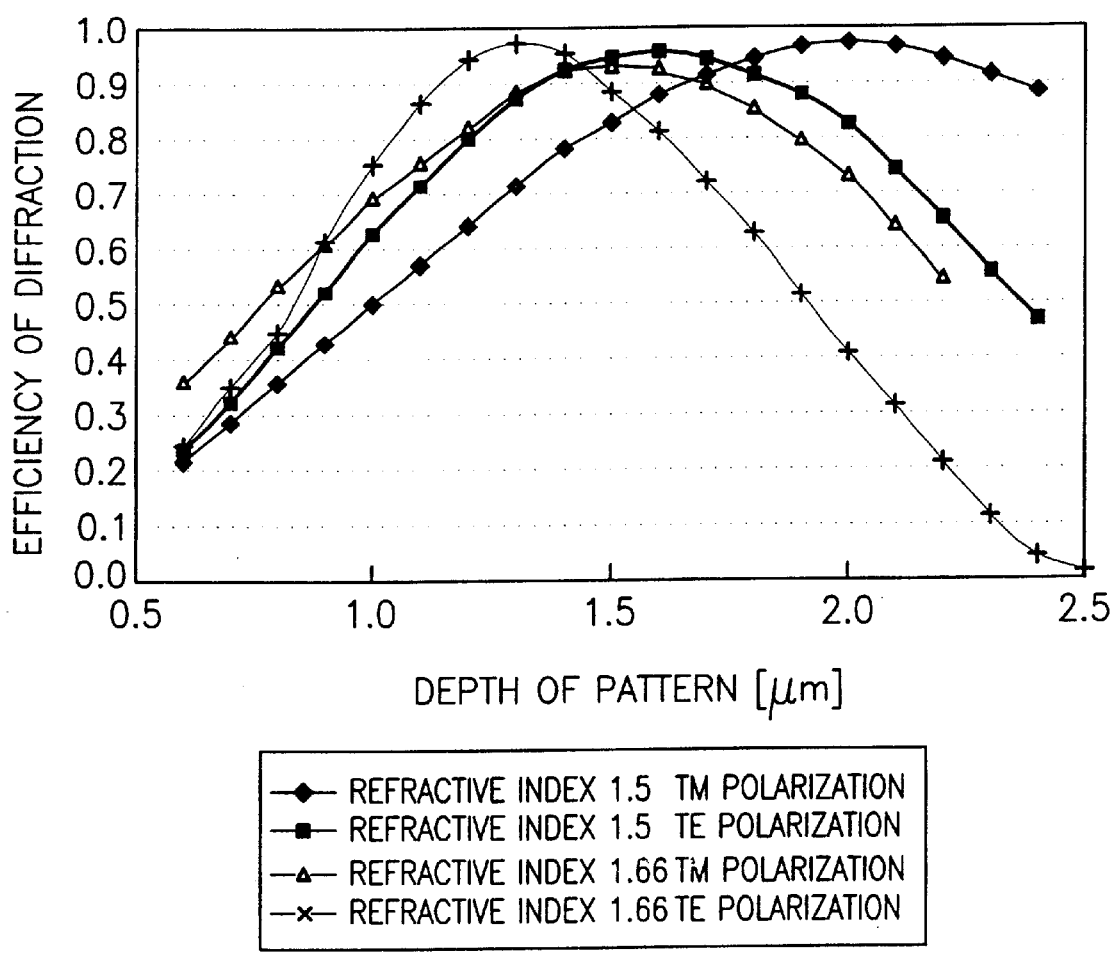
FIG. 11 is graph of the efficiency of diffraction versus the depth of the pattern for four different combinations of refractive index and polarization, light of 785 nm wavelength, and a deflection disk having a track pitch of 0.9 μm.

Table 1 indicates the relation between the depth of a pattern and the efficiency of diffraction for light of TM polarization and light of TE polarization when a predetermined diffraction pattern is formed on materials having refractive indices of 1.5 and 1.66. Here, the pattern has a track pitch of 0.9 µm and the light incident on the pattern is a laser beam of 785 nm wavelength. FIG. 11 is a graph showing the data of Table 1.

TABLE 1

| Depth of pattern (µm) | Refractive index of 1.5 | | Refractive index of 1.66 | |
|---|---|---|---|---|
| | TM polarization | TE polarization | TM polarization | TE polarization |
| 0.6 | 0.215251 | 0.236390 | 0.353735 | 0.256196 |
| 0.7 | 0.282010 | 0.319027 | 0.445293 | 0.345447 |
| 0.8 | 0.352597 | 0.415746 | 0.530998 | 0.469411 |
| 0.9 | 0.425137 | 0.519394 | 0.610439 | 0.614756 |
| 1.0 | 0.498307 | 0.621986 | 0.687614 | 0.757633 |
| 1.1 | 0.571397 | 0.716900 | 0.761964 | 0.871562 |
| 1.2 | 0.642786 | 0.798873 | 0.827261 | 0.940734 |
| 1.3 | 0.710170 | 0.865038 | 0.879426 | 0.962638 |
| 1.4 | 0.772662 | 0.914075 | 0.915194 | 0.942787 |
| 1.5 | 0.829145 | 0.944745 | 0.931966 | 0.891214 |
| 1.6 | 0.877306 | 0.956574 | 0.929519 | 0.817086 |
| 1.7 | 0.916358 | 0.949668 | 0.907098 | 0.727521 |
| 1.8 | 0.946007 | 0.924158 | 0.865238 | 0.628419 |
| 1.9 | 0.964631 | 0.880941 | 0.806431 | 0.524013 |
| 2.0 | 0.971642 | 0.821743 | 0.733488 | 0.417389 |
| 2.1 | 0.967419 | 0.748711 | 0.649882 | 0.311770 |
| 2.2 | 0.951717 | 0.664665 | 0.558827 | 0.211925 |
| 2.3 | 0.924215 | 0.573061 | | 0.124318 |
| 2.4 | 0.887837 | 0.477634 | | 0.056233 |
| 2.5 | | | | 0.013882 |

In Table 1 and FIG. 11, when the material having a refractive index of 1.5 is selected, in the conventional case of light of TM polarization, a maximum diffraction efficiency of 97.1642% is obtained at the depth of pattern of 2.0 µm. For light of TE polarization according to the present invention, a maximum diffraction efficiency of 95.6574% is obtained at the depth of pattern of 1.6 µm. Also, when the material having a refractive index of 1.66 is selected, light of TM polarization has a maximum diffraction efficiency of 93.1966% at a pattern depth of 1.5 µm, while the light of TE polarization has a maximum diffraction efficiency of 96.2638% at a pattern depth of 1.3 µm.

Figure 12:
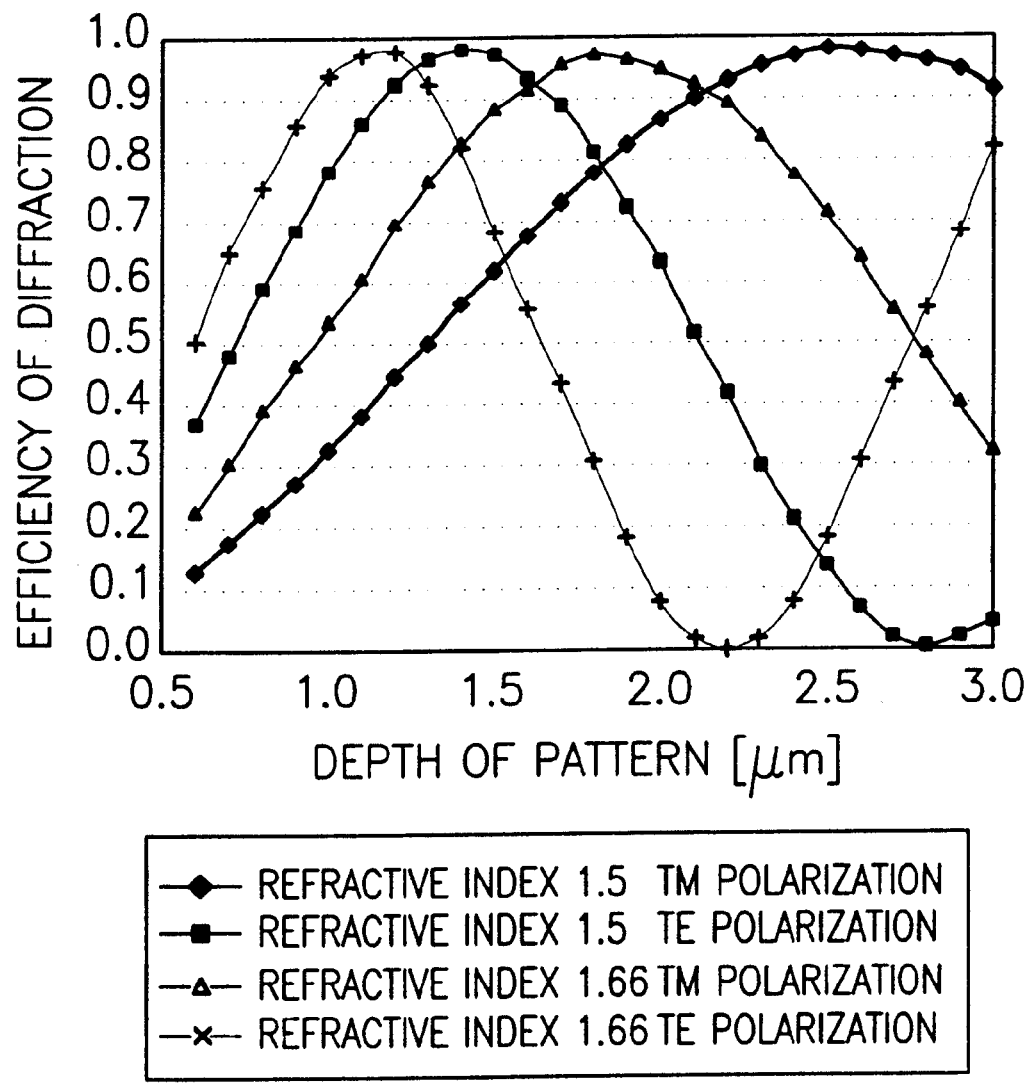
FIG. 12 is a graph of the efficiency of diffraction versus the depth of the pattern for four different combinations of refractive index and polarization, light of 785 nm wavelength, and a deflection disk having a track pitch of 0.68 μm.

Table 2 shows the relation between the pattern depth and the efficiency of diffraction for light of TM polarization and light of TE polarization when a predetermined diffraction pattern is, formed on materials having refractive indices of 1.5 and 1.66. Here, the pattern has a track pitch of 0.68 µm and the light incident on the pattern is a laser beam of 785 nm wavelength. FIG. 12 is a graph showing the data of Table 2.

TABLE 2

| Depth of pattern (µm) | Refractive index of 1.5 | | Refractive index of 1.66 | |
|---|---|---|---|---|
| | TM polarization | TE polariation | TM polarization | TE polarization |
| 0.6 | 0.129000 | 0.375000 | 0.238000 | 0.546000 |
| 0.7 | 0.173000 | 0.484000 | 0.312000 | 0.681000 |
| 0.8 | 0.221000 | 0.593000 | 0.389000 | 0.802000 |
| 0.9 | 0.271000 | 0.699000 | 0.471000 | 0.896000 |
| 1.0 | 0.326000 | 0.793000 | 0.553000 | 0.957000 |
| 1.1 | 0.385000 | 0.873000 | 0.633000 | 0.982000 |
| 1.2 | 0.443000 | 0.935000 | 0.710000 | 0.966000 |
| 1.3 | 0.503000 | 0.975000 | 0.779000 | 0.909000 |
| 1.4 | 0.563000 | 0.990000 | 0.84000 | 0.820000 |
| 1.5 | 0.621000 | 0.981000 | 0.894000 | 0.704000 |
| 1.6 | 0.678000 | 0.948000 | 0.934000 | 0.569000 |
| 1.7 | 0.732000 | 0.893000 | 0.961000 | 0.429000 |
| 1.8 | 0.782900 | 0.817000 | 0.978000 | 0.294000 |
| 1.9 | 0.828000 | 0.726000 | 0.979000 | 0.174000 |
| 2.0 | 0.870000 | 0.623000 | 0.965000 | 0.081300 |
| 2.1 | 0.905000 | 0.514000 | 0.940000 | 0.021700 |

TABLE 2-continued

| Depth of pattern (μm) | Refractive index of 1.5 | | Refractive index of 1.66 | |
|---|---|---|---|---|
| | TM polarization | TE polariation | TM polarization | TE polarization |
| 2.2 | 0.934000 | 0.404000 | 0.901000 | 0.000777 |
| 2.3 | 0.958000 | 0.299000 | 0.851000 | 0.020200 |
| 2.4 | 0.974000 | 0.203000 | 0.791000 | 0.078300 |
| 2.5 | 0.982000 | 0.122000 | 0.722000 | 0.171000 |
| 2.6 | 0.983000 | 0.058900 | 0.647000 | 0.290000 |
| 2.7 | 0.978000 | 0.017900 | 0.568009 | 0.426000 |
| 2.8 | 0.964000 | 0.000718 | 0.486000 | 0.568000 |
| 2.9 | 0.944000 | 0.008120 | 0.405000 | 0.704000 |
| 3.0 | 0.918000 | 0.039800 | 0.327000 | 0.823000 |

Here, for a refractive index of 1.5, conventional light of TM polarization has a maximum diffraction efficiency of 98.3000% at the depth of 2.6 μm, while the light of TE polarization has a maximum diffraction efficiency of 99.0000% at the depth of pattern of 1.4 μm. In the case of a refractive index of 1.66, while light of TM polarization has a maximum diffraction efficiency of 97.9000% at the depth of pattern of 1.9 μm, light of TE polarization has a maximum diffraction efficiency of 98.2000% at the depth of pattern of 1.1 μm.

Thus, when light of TE polarization is incident on the deflection disk in the present invention, an identical or a very similar efficiency of diffraction can be achieved with a relatively small depth of a pattern.

As described above, in the hologram scanner according to the present invention, the direction of the major axis of a light spot is perpendicular to the radius vector at the point of projection on the deflection disk, and simultaneously, light of TE polarization is incident on the deflection disk, so that a desired diffraction efficiency can be obtained at a relatively shallow hologram pattern depth compared to a conventional hologram scanner.

Thus, by forming a hologram pattern having a relatively small depth of pattern with respect to a track pitch which is fixed when the deflection disk is manufactured, the shape of the pattern is prevented from being deformed so that yield in mass production can be drastically increased.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A hologram scanner, comprising:
   a driving source for providing a rotational force, said source having a rotation shaft;
   connected to the rotation shaft, a deflection disk adapted for forming a scanning line, the deflection disk having a plurality of sectors wherein a hologram pattern for diffracting and deflecting incident light is formed;
   a transverse electric (TE) polarized light emitting device, facing a side of the deflection disk and adapted for emitting TE polarized light in a manner such that a major axis of an elliptical spot formed by incident light at a predetermined position on the deflection disk is perpendicular to a radius vector of the deflection disk passing through said elliptical spot; and
   an optical path-altering means adapted for causing a scanning line formed by the rotation of the deflection disk to proceed to a photoreceptor medium.

2. The hologram scanner of claim 1, wherein the TE polarized light emitting device comprises:
   a laser diode formed by depositing semiconductor material layers in a plane on a substrate, and adapted for laterally emitting light of S polarization having an elliptical cross-section wherein a major axis is aligned perpendicular to the plane of the semiconductor material layers; and
   a half wavelength plate located between the laser diode and the deflection disk, adapted for altering the light of S polarization to light of P polarization.

3. The hologram scanner of claim 1, wherein the TE polarized light emitting device comprises a laser diode formed by depositing semiconductor material layers in a plane on a substrate, said diode adapted for laterally emitting light of P polarization having an elliptical cross-section wherein a major axis is aligned perpendicular to the plane of the semiconductor material layers.

4. The hologram scanner of claim 1, wherein the optical path-altering device comprises:
   a flat mirror adapted for reflecting the light deflected and scanned by the deflection disk;
   a curved mirror adapted for focusing and reflecting the light reflected by the flat mirror; and
   a hologram device disposed between the curved mirror and the photoreceptor medium and adapted for diffracting and transmitting an incident scanning line.

5. In a hologram scanner comprising:
   a light source for providing an incident laser beam;
   a deflector for diffracting and deflecting the laser beam to form a scanning line, said line having a proceeding direction, whereby a hologram pattern is formed in the deflector, said hologram pattern having a pattern depth; and
   an optical path-altering means adapted for altering the proceeding direction of the scanning line, whereby the laser beam is scanned in an in-scan direction across a photoreceptor and successive scanning lines proceed in a predetermined direction;
   the improvement comprising: a depth-control means for improving efficiency of diffraction and for decreasing the pattern depth of the hologram.

6. The scanner of claim 5, wherein:
   the incident laser beam forms an elliptical spot on the deflector; and
   the depth control means comprises a means for causing a major axis of the elliptical spot to be perpendicular to a radius vector oft he deflector passing through the spot.

7. In a method of hologram scanning, said method comprising the steps of
   (1) emitting a light beam from a laser; and
   (2) deflecting and diffracting the laser beam to cause it to be scanned in an in-scan direction across a photoreceptor whereby successive scan lines proceed in a predetermined direction and a hologram pattern is formed, said pattern having a pattern depth;
   the improvement comprising: a step for controlling the pattern depth in a manner such that the pattern depth is decreased and the efficiency of diffraction is not decreased.

8. The method of claim 7, wherein:

the incident laser beam forms an elliptical spot on a deflection disk; and the pattern depth is controlled by causing a major axis of the elliptical spot to be perpendicular to a radius vector of the deflection disk passing through the spot.

9. A method for increasing yield in mass production of hologram scanners, said method comprising the steps of:

(1) providing a driving source for providing a rotational force, said source having a rotation shaft;

(2) connecting to the rotation shaft, a deflection disk for forming a scanning line, the deflection disk having a plurality of sectors wherein a hologram pattern for diffracting and deflecting incident light is formed;

(3) providing a transverse electric (TE) polarized light emitting device, facing a side of the deflection disk, for emitting TE polarized light in a manner such that a major axis of an elliptical spot formed by incident light at a predetermined position on the deflection disk is perpendicular to a radius vector of the deflection disk passing through said elliptical spot; and (4) providing an optical path-altering means for causing a scanning line formed by the rotation of the deflection disk to proceed to a photoreceptor medium.

10. The method of claim 9, wherein the TE polarized light emitting device comprises:

a laser diode formed by depositing semiconductor material layers in a plane on a substrate, and adapted for laterally emitting light of S polarization having an elliptical cross-section wherein a major axis is aligned perpendicular to the plane of the semiconductor material layers; and a half wavelength plate located between the laser diode and the deflection disk and adapted for altering the light of S polarization to light of P polarization.

* * * * *